(12) United States Patent
Teillet et al.

(10) Patent No.: US 11,672,202 B2
(45) Date of Patent: Jun. 13, 2023

(54) TRANSMISSION HOUSING, AND WHEELED VEHICLE COMPRISING A HOUSING OF THIS TYPE

(71) Applicant: FRANCE REDUCTEURS, Les Herbiers (FR)

(72) Inventors: Emmanuel Teillet, Les Chatelliers Chateaumur (FR); Damien Morand, Chavagnes en Paillers (FR)

(73) Assignee: FRANCE REDUCTEURS, Les Herbiers (FR)

( * ) Notice: Subject to any disclaimer, the term of this patent is extended or adjusted under 35 U.S.C. 154(b) by 311 days.

(21) Appl. No.: 16/755,497

(22) PCT Filed: Oct. 2, 2018

(86) PCT No.: PCT/FR2018/052423
§ 371 (c)(1),
(2) Date: Apr. 10, 2020

(87) PCT Pub. No.: WO2019/077222
PCT Pub. Date: Apr. 25, 2019

(65) Prior Publication Data
US 2021/0204475 A1 Jul. 8, 2021

(30) Foreign Application Priority Data
Oct. 16, 2017 (FR) ...................................... 1759651

(51) Int. Cl.
*F16D 11/14* (2006.01)
*A01D 34/69* (2006.01)
(Continued)

(52) U.S. Cl.
CPC ......... *A01D 34/69* (2013.01); *A01D 34/6812* (2013.01); *B60K 17/02* (2013.01);
(Continued)

(58) Field of Classification Search
CPC ........................ F16D 11/14; A01D 2034/6837
See application file for complete search history.

(56) References Cited

U.S. PATENT DOCUMENTS

| 2,722,281 A | 11/1955 | Falkenberg |
| 5,850,758 A | 12/1998 | McCloud et al. |
| (Continued) | | |

FOREIGN PATENT DOCUMENTS

CN 2 499 262 7/2002

OTHER PUBLICATIONS

International Search Report dated Dec. 19, 2018.
Search Report dated Jun. 22, 2018.

*Primary Examiner* — Stacey A Fluhart
(74) *Attorney, Agent, or Firm* — Ipsilon USA, LLP (57) ABSTRACT

The invention relates to a transmission housing (1) comprising a housing (1) body (1A) which defines an enclosure (1B) and, arranged at least partly inside said enclosure (1B), an input shaft (2), an output shaft (3) and a mechanism (4) for transmitting the movement of the input shaft (2) to the output shaft (3), this movement transmitting mechanism (4) comprising at least one clutch (5), the clutch (5) comprising a driving element (6) and a driven element (7), the driven element (7) being mounted for conjoined rotation with the output shaft (3) and comprising an active part (8) of the clutch (5) and a sleeve (9) that carries said active part (8) of the clutch (5), wherein the active part (8) of the clutch (5) is in bearing contact with the driving element (6) of the clutch (5) when the clutch (5) is in the engaged position, the sleeve (9) being coaxial to the output shaft (3) and mounted for conjoined rotation with the output shaft (3), the sleeve (9) of the driven element (7) being made in a single piece with the active part (8) of the driven element (7), and the sleeve (9) being disposed between the output shaft (3) and the body (1A) of the housing (1).

12 Claims, 11 Drawing Sheets

(51) Int. Cl.
*A01D 34/68* (2006.01)
*B60K 17/02* (2006.01)
*F16D 13/26* (2006.01)

(52) U.S. Cl.
CPC .............. *F16D 11/14* (2013.01); *F16D 13/26* (2013.01); *A01D 2034/6837* (2013.01)

(56) References Cited

U.S. PATENT DOCUMENTS

| | | | | |
|---|---|---|---|---|
| 6,701,796 | B2* | 3/2004 | Blanchard | ............... F16H 55/22 56/11.8 |
| 7,850,555 | B2* | 12/2010 | Keane | .................... A01D 69/08 474/37 |
| 2016/0223064 | A1* | 8/2016 | Yamanaka | ............ F16D 27/118 |

* cited by examiner

TRANSMISSION HOUSING, AND WHEELED VEHICLE COMPRISING A HOUSING OF THIS TYPE

RELATED APPLICATION

This application is a National Phase of PCT/FR2018/052423 filed on Oct. 2, 2018, which in turn claims the benefit of priority from French Patent Application No. 17 59651 filed on Oct. 16, 2017, the entirety of which are incorporated by reference.

FIELD OF THE INVENTION

The invention relates to a transmission housing and a wheeled vehicle equipped with such a housing.

It relates more particularly to a transmission housing comprising a housing body delimiting an enclosure and, disposed at least partially inside said enclosure, an input shaft, an output shaft and a mechanism for transmitting the movement of the input shaft to the output shaft, this movement transmission mechanism comprising at least one clutch, the clutch comprising a driving element and a driven element, the driven element being mounted to be secured in rotation to the output shaft, at least one of the driven or driving elements of the clutch being mounted to be able to be displaced for the driving and driven elements of the clutch to switch from a position separated from one another corresponding to the declutched position of the clutch to a position close to one another corresponding to the clutched position of the clutch, the driven element of the clutch comprising an active part of the clutch and a sleeve which bears the active part of the clutch, the active part of the clutch being in bearing contact with the driving element of the clutch in the clutched position of the clutch, the sleeve being coaxial to the output shaft and mounted to be secured in rotation to the output shaft.

PRIOR ART

Such a transmission housing is known. However, it is characterized by a high number of parts which means that its assembly in the factory is difficult and takes a long time. Furthermore, because of the current design of the transmission housings, it is not generally possible to insert the output shaft in the closed state of the housing. Indeed, such an output shaft supports a large number of parts which are not held inside the housing, in the absence of the output shaft.

AIMS AND SUMMARY

One aim of the invention is to propose a transmission housing of the abovementioned type, whose simplified design allows for a reduction of the number of parts and ease of assembly in the factory.

Another aim of the invention is to propose a transmission housing whose design allows for an easy insertion of the output shaft into the housing, in the closed state of the housing.

To this end, the subject of the invention is a transmission housing comprising a body of the housing delimiting an enclosure and, disposed at least partially inside said enclosure, an input shaft, an output shaft and a mechanism for transmitting the movement of the input shaft to the output shaft, this movement transmission mechanism comprising at least one clutch, the clutch comprising a driving element and a driven element, the driven element being mounted to be secured in rotation to the output shaft, at least one of the driven or driving elements of the clutch being mounted to be able to be displaced for the driving and driven elements of the clutch to switch from a position separated from one another corresponding to the declutched position of the clutch to a position close to one another corresponding to the clutched position of the clutch, the driven element of the clutch comprising an active part of the clutch, and a sleeve which bears the active part of the clutch, the active part of the clutch being in bearing contact with the driving element of the clutch in the clutched position of the clutch, the sleeve being coaxial to the output shaft and mounted to be secured in rotation to the output shaft, characterized in that the sleeve of the driven element is produced in a single piece with the active part of the driven element and in that the sleeve is interposed between the output shaft and the body of the housing.

By virtue of the fact that the sleeve is interposed between the output shaft and the body of the housing, the sleeve isolates the output shaft from the inside of the housing. Direct contact of the shaft with the interior of the housing is therefore prevented.

The sleeve guides the output shaft over all the length of the shaft disposed inside the transmission housing. Any contact between the output shaft and the body of the housing is avoided. The result thereof is a simplification in terms of seal-tightness with the housing, and an ease of mounting of the shaft inside the housing, in the closed state of the housing.

According to one embodiment, the output shaft is, in the closed position of the enclosure of the housing, removably mounted inside the enclosure of the housing. The result thereof is a possibility of easy dismantling of the output shaft from the transmission housing.

According to one embodiment of the invention, the output shaft is a shaft passing through the body of the housing and protruding from the body of the housing through two openings formed in the body of the housing, and the sleeve is, at these openings, interposed between the output shaft and the body of the housing.

According to one embodiment of the invention, the driving element is threaded onto the sleeve.

According to one embodiment of the invention, the sleeve is internally grooved longitudinally and is mounted to be secured in rotation to the output shaft via at least one external radial protuberance of the output shaft, this external radial protuberance being produced in a single piece with the output shaft or formed by at least one element added on to the output shaft, this at least one external radial protuberance being slidingly inserted into an internal longitudinal groove of the sleeve.

According to one embodiment of the invention, the sleeve at least partially protrudes from the body of the housing.

According to one embodiment of the invention, the sleeve is mounted to be secured in rotation to the output shaft via at least one link member disposed outside the body of the housing. The result thereof is an ease of assembly or of dismantling of the shaft in the closed position of the housing, in order, for example, to mount the output shaft after the housing has been closed or to replace the output shaft.

According to one embodiment of the invention, the driving element of the clutch is a rotary element that can be driven in rotation by the input shaft.

According to one embodiment of the invention, the clutch is a non-progressive clutch, preferably a claw clutch, or a progressive clutch, preferably a cone or disk clutch.

According to one embodiment of the invention, the housing comprises, for the switch from the declutched position to the clutched position, a control device for the clutch.

According to one embodiment of the invention, the driven element is limited in axial displacement at least in the direction of a separation from the driving element.

According to one embodiment of the invention, the housing comprises at least one return member for returning the driving and driven elements into the position separated from one another corresponding to the declutched position.

According to one embodiment of the invention, the body of the housing is formed by at least two shells joined to one another in the closed position of the housing.

Another subject of the invention is a wheeled vehicle equipped with a transmission housing comprising a body of the housing delimiting an enclosure and, disposed at least partially inside said enclosure, an input shaft, an output shaft and a mechanism for transmitting the movement of the input shaft to the output shaft, this movement transmission mechanism comprising at least one clutch, the clutch comprising a driving element and a driven element, the driven element being mounted to be secured in rotation to the output shaft, at least one of the driven or driving elements of the clutch being mounted to be able to be displaced axially along the output shaft for the driving and driven elements of the clutch to switch from a position separated from one another corresponding to the declutched position of the clutch to a position close to one another corresponding to the clutched position of the clutch, the driven element of the clutch comprising an active part of the clutch and a sleeve which bears the active part of the clutch, the active part of the clutch being in bearing contact with the driving element of the clutch in the clutched position of the clutch, the sleeve being coaxial to the output shaft and mounted to be secured in rotation to the output shaft, characterized in that the transmission housing is of the abovementioned type, and in that the output shaft of the transmission housing is the shaft driving the wheels of the vehicle.

BRIEF DESCRIPTION OF THE DRAWINGS

The invention will be well understood on reading the following description of exemplary embodiments, with reference to the attached drawings in which:

FIG. 4b represents a vertical cross-sectional view passing through the output shaft of the transmission housing of FIG. 4a.

DETAILED DESCRIPTION

As mentioned above, the invention relates to a transmission housing 1 intended to be installed on a wheeled vehicle 20 to allow the wheels 26 of the vehicle 20 to be driven in rotation from the motor 21 with which said vehicle is equipped.

Figure 1:
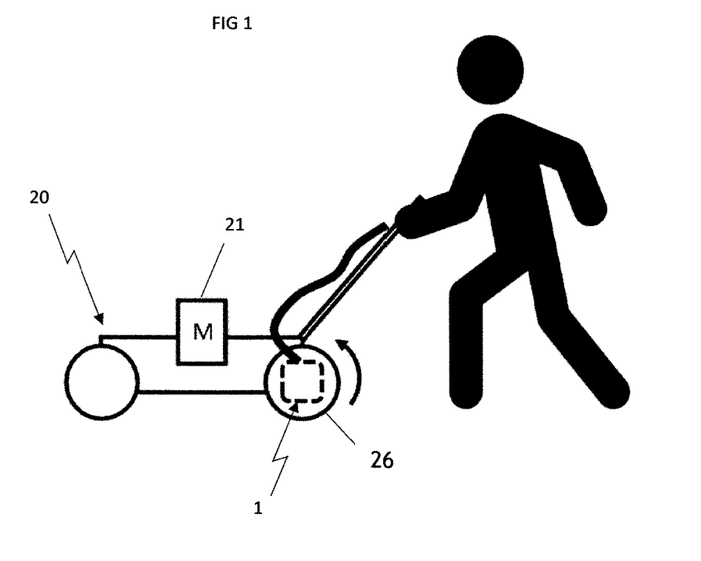
FIG. 1 represents a schematic view of a vehicle equipped with a transmission housing according to the invention.

The transmission housing 1 is therefore generally disposed on the shaft driving the wheels 26 of the vehicle 20 in rotation, as represented in FIG. 1, this shaft being called hereinbelow the output shaft 3 of the transmission housing 1.

The wheeled vehicle 20 is here a lawn mower, but the invention can be applied to other types of wheeled vehicles, notably with the driver walking behind the vehicle 20.

The transmission housing 1 comprises a housing body 1A delimiting an enclosure 1B. This housing body 1A is, in the example represented, formed by two shells 1A1, 1A2 joined to one another. The joining zone at which the shells 1A1, 1A2 are joined to one another by bonding and/or screwing or other means is called joint plane.

This transmission housing 1 also comprises an input shaft 2 partially housed inside the enclosure 1B of the housing body 1A. To this end, an opening is formed in the body 1A of the transmission housing 1.

The transmission housing 1 also comprises, as mentioned above, an output shaft 3, also partially housed inside the body 1A of the transmission housing.

This output shaft 3 can protrude from the housing body 1A through one or two openings 1C formed in the body 1A of the housing. In the example represented, the output shaft 3 passes through the body 1A of the housing and protrudes from the body 1A of the housing through two openings represented as 1C in the figures.

The transmission housing 1 also comprises a mechanism 4 for transmitting the movement of the input shaft 2, which is a rotary shaft, to the output shaft 3. The input shaft 2 is itself driven in rotation via endless transmission means 22 external to the housing 1. These endless transmission means 22 comprise an endless belt transmission 23 which is disposed between a drive pulley 24 mounted on the motor 21, in particular on the output shaft of said motor 21, and a pulley 25 borne by the input shaft 2 of the transmission housing 1.

Obviously, other embodiments of the means for driving the input shaft in rotation can be envisaged without departing from the scope of the invention.

The transmission of rotational movement from the input shaft 2 to the output shaft 3 is done using a movement transmission mechanism 4 which is housed inside the enclosure 1B of the transmission housing 1, and which comprises at least one clutch 5.

Finally, the transmission housing 1 comprises a control device 9, 10 for the clutch 5 for switching the clutch 5 from the declutched position to the clutched position. This control device 9, 10 for the clutch 5 can be disposed inside or outside the transmission housing 1.

The clutch 5 comprises a driving element 6 and a driven element 7. The driven element 7 is mounted to be secured in rotation to the output shaft 3.

At least one of the driven 7 or driving 6 elements of the clutch is mounted to be able to be axially displaced along the output shaft, for the driving 6 and driven 7 elements of the clutch 5 to switch from a position separated from one another corresponding to the declutched position of the clutch 5 to a position close to one another corresponding to the clutched position of the clutch 5.

In all the examples represented, it is the driving element 6 which, using the clutch control device 10, 11, can be displaced in the direction of convergence of the driven element for the switching of the driving 6 and driven 7 elements of the clutch 5 from a position separated from one another to a position close to one another.

In the examples represented, the driven element 7 of the clutch 5 comprises an active part 8 of the clutch and a sleeve 9 which bears the active part 8 of the clutch. This active part 8 of the clutch is in bearing contact with the driving element 6 of the clutch 5 in the clutched position of the clutch 5.

The sleeve 9 is, for its part, coaxial to the output shaft 3 and mounted to be secured in rotation to the output shaft 3. This sleeve 9 of the driven element 7 is produced in a single piece with the active part 8 of the driven element 7, and the sleeve 9 is interposed between the output shaft 3 and the body 1A of the housing 1.

Thus, the sleeve 9 extends, in the example represented, from one opening 1C to another opening 1C of the housing body, when the output shaft 3 is a through shaft which protrudes from the body 1A of the housing through said openings 1C. The sleeve 9 is thus, at the openings 1C, interposed between the output shaft 3 and the body 1A of the housing.

The design of the clutch 5 can be diverse and varied, based on the type of clutch and on the design of the clutch control device 10, 11. Indeed, the clutch 5 can be a non-progressive clutch, such as a claw clutch, or a progressive clutch, such as a cone or disk clutch.

The clutch control device 10, 11 comprises, for its part, a member 10 for controlling the convergence of the driving element to the driven element and a member 11 for maneuvering the convergence control member 10.

The driving element 6 of the clutch 5, which is a rotary element which can be driven in rotation by the input shaft 2, can be able to be axially displaced along the output shaft. This driving element 6 can be threaded onto the sleeve 9.

Other embodiments of this driving element 6 can be envisaged.

Figure 3:
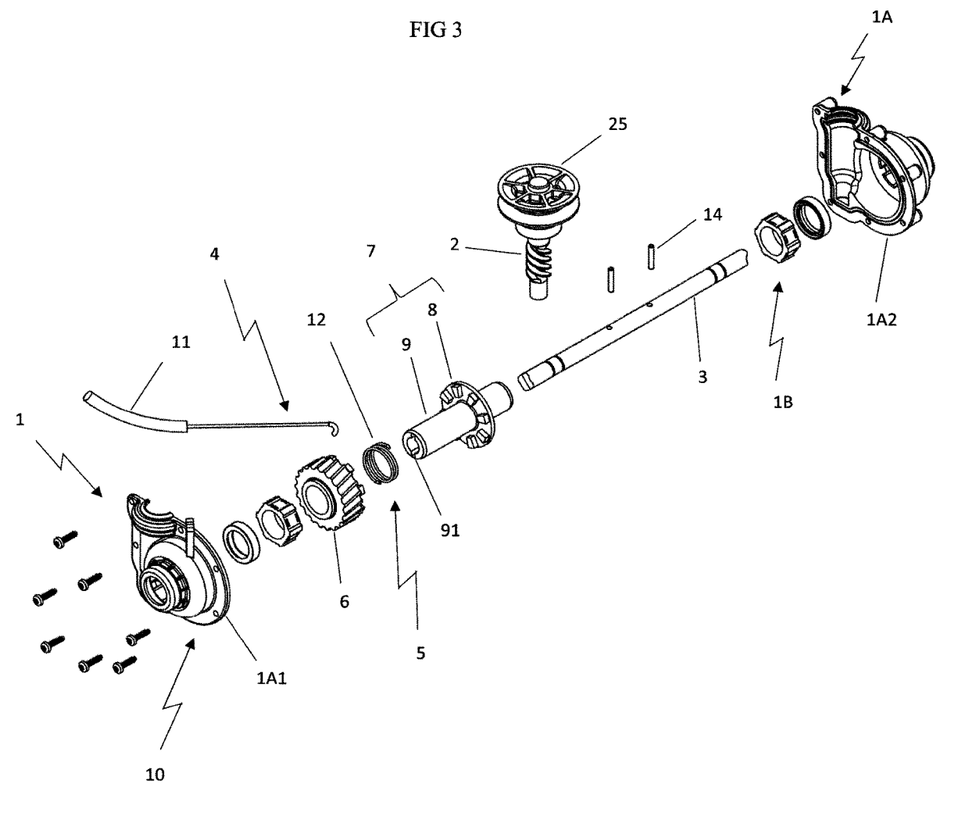
FIG. 3 represents a view of a transmission housing according to the invention showing an exploded view of its constituent elements.
Figure 4A:
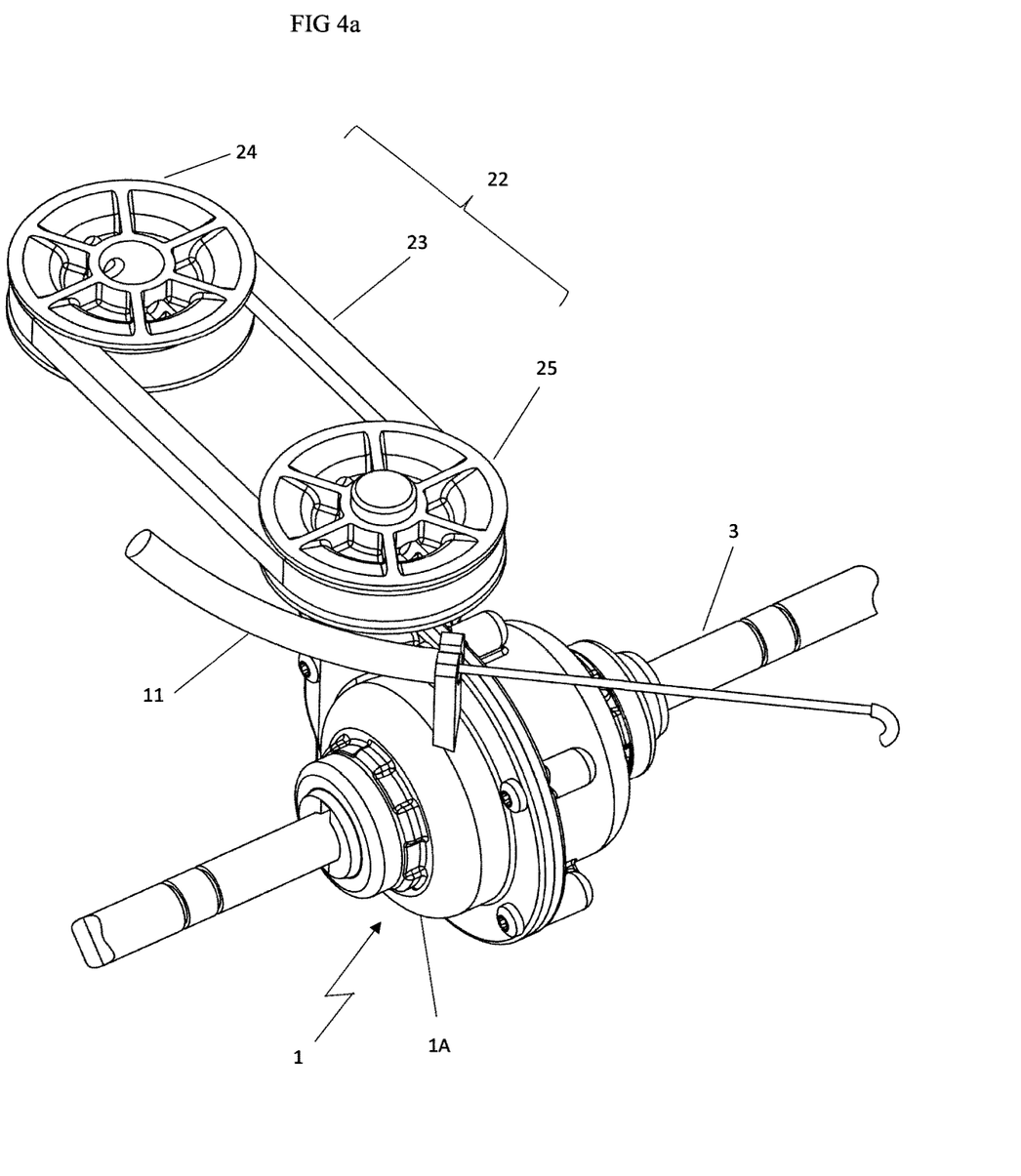
FIG. 4a represents a partly perspective and schematic view of the transmission housing and the link to the motor of the vehicle.
Figure 4B:
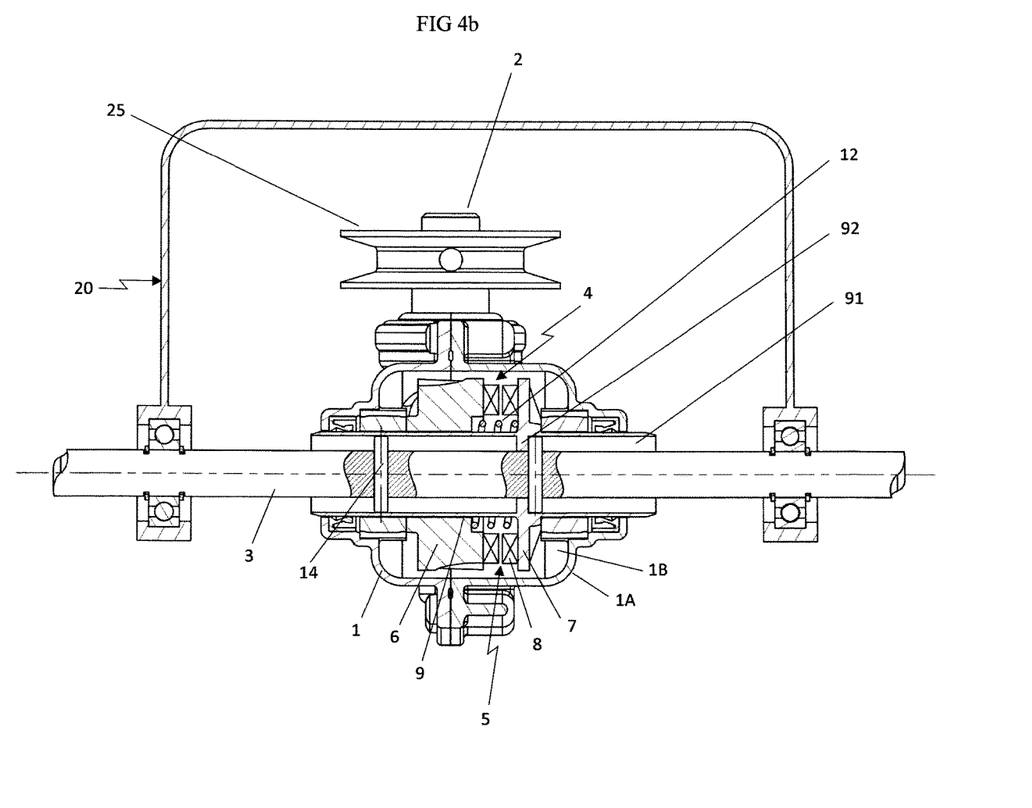

FIG. 3 illustrates the example of a claw clutch 5. The driving element 6 is a toothed wheel mounted to rotate freely and to be able to be axially displaced along the output shaft 3. This toothed wheel is provided, on its face facing the driven element 7, with teeth. This toothed wheel meshes with a worm screw which forms the input shaft of the housing 1.

The active part 8 of the driven element 7 is, for its part, formed by a plate surrounding the sleeve 9 and produced in a single piece with the sleeve 9. This plate is provided, on its face facing the toothed wheel, with teeth intended to cooperate with the teeth of the toothed wheel, in the clutched position of the clutch 5.

In this embodiment of FIG. 3, the device 10, 11 for controlling the convergence of the driving element to the driven element comprises a convergence control member 10 formed by the body 1A of the housing that can be slidingly displaced along the sleeve 9 and the output shaft 3, and a member 11 for maneuvering the control member 10 formed by a cable/sheath assembly that can be coupled to the body 1A of the housing for the sliding displacement of the body 1A of the housing along the sleeve 9.

In the examples represented, the clutch 5 comprises a return member 12 for returning the driving element 6 and the driven element 7 in the direction of separation from one another, and the body 1A is configured to, during its sliding displacement along the output shaft 3 in a direction corresponding to the switching of the clutch 5 from the declutched position to the clutched position, drive the driving element 6 in displacement in the direction of convergence of the driven element 7 against the return member 12. This return member 12 is formed by a helical spring 12 which can be disposed between the driving element 6 and the driven element 7 or between the driven element 7 and the body 1A of the housing.

To allow such a sliding displacement of the body 1A of the housing along the output shaft 3, the clutch 5 control device comprises a member 11 for maneuvering the member 10 controlling the convergence of the driving element 6 and the driven element 7 that can be coupled to the body 1A of the housing, and the body 1A of the housing forming the member 10 controlling the convergence of the driving element 6 and the driven element 7 can be slidingly displaced along the output shaft 3 in a direction corresponding to the switching of the clutch 5 from the declutched position to the clutched position under the action of a pull or a push exerted on said maneuvering member 11, to the coupled state of the maneuvering member 11 to the body 1A of the housing.

This maneuvering member 11 can take a large number of forms. In the example represented, this maneuvering member 11 is an assembly formed by a cable and a sheath. A lug disposed on the body 1A of the housing couples this assembly to the body 1A of the housing.

In the example represented, the sheath is coupled at one end to the body 1A of the housing and at its other end, to the frame of the vehicle 20. The cable is, for its part, fixed at one end to the frame of the vehicle 20 and at its other end to the handlebar of the vehicle, via a pivoting lever that can be actuated by the driver of the vehicle. The actuation of this lever generates traction on the cable, and consequently, a deformation of the sheath, which brings about at least a sliding displacement of the body 1A of the housing along the output shaft, as illustrated in FIGS. 2b and 2c.

Obviously, other embodiments of this maneuvering member 11 can be envisaged without departing from the scope of the invention.

Thus, the cable/sheath assembly could have been replaced by a maneuvering rod, by a cable directly fixed to the body 1A of the housing, or the like.

Figure 2A:
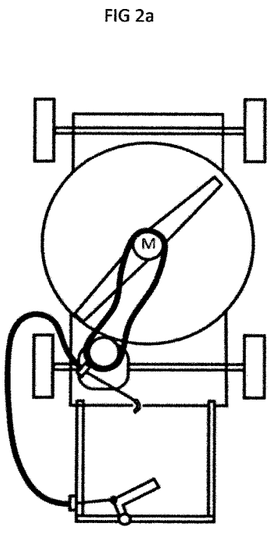
FIG. 2 represents, in the form of three parallel plan views, the switch from the declutched position to the clutched position.
Figure 2B:
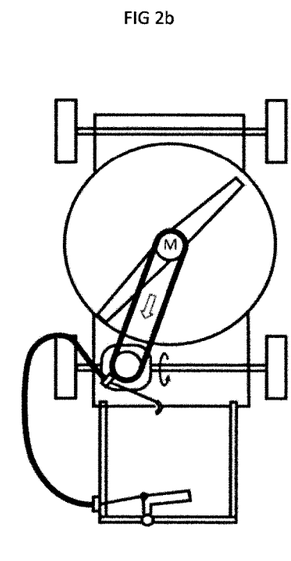
Figure 2C:
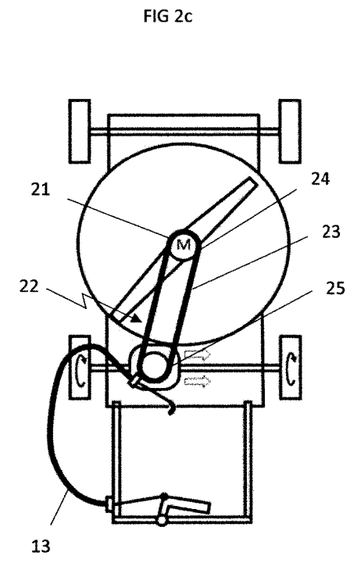

In the example represented in FIGS. 2a to 2c, the body 1A of the housing is also mounted to oscillate about the output shaft 3 in the direction of a tensioning or a relaxing of the transmission belt 23. The maneuvering member 11 can therefore be used on the one hand to, initially, provoke, by oscillation of the body 1A of the housing about the output shaft 3, the tensioning of the endless transmission belt 23 between the motor 21 and the input shaft 2, then, secondly, the sliding displacement of the body 1A of the housing along the output shaft 3. This oscillating movement can be eliminated when the maneuvering member 11 controls only a sliding displacement of the body 1A of the housing along the output shaft 3, the belt 23 being either permanently taut, or tautened by another means.

The driving of the body 1A of the housing by sliding displacement therefore brings about, in this embodiment, the convergence of the toothed wheel to the toothed plate. The spring 12 disposed between the facing faces of the plate and of the toothed wheel returns the toothed wheel and, consequently, the body 1A of the housing to the separated position of the toothed plate, corresponding to the declutched position of the clutch 5.

Figure 5:
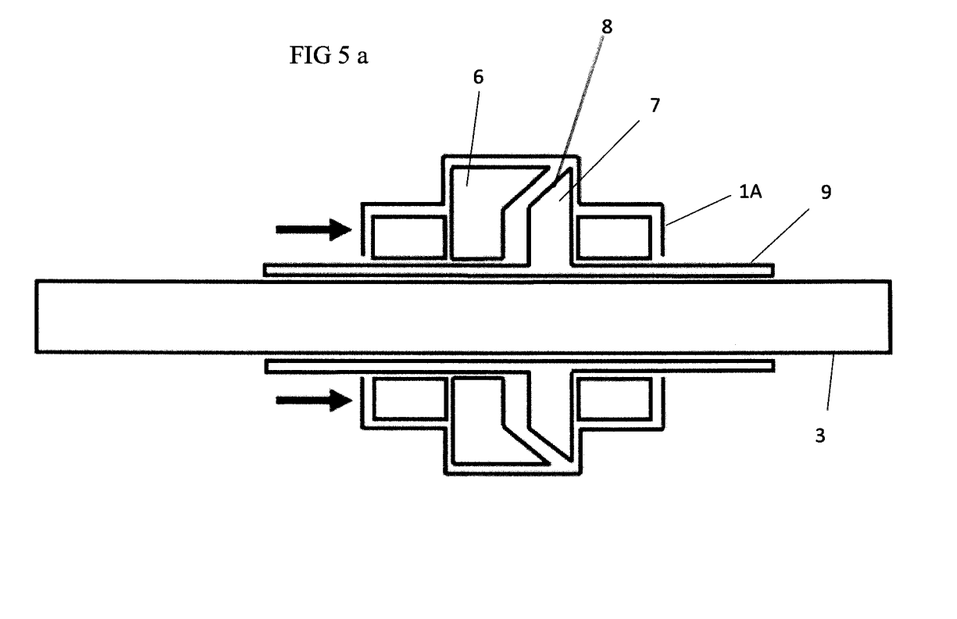
FIGS. 5a and 5b respectively represent a schematic view of a transmission housing in the declutched position of the cone clutch (FIG. 5a) and in the clutched position of the cone clutch (FIG. 5b).

FIGS. 5a and 5b illustrate a similar operation of the clutch 5. The clutch 5 is, in this case, a cone clutch, with the driving element 6 formed by a toothed wheel having, internally, a so-called female conical part, and the driven element 7 formed, at its active part 8, by a cone constituting a male part that can be inserted into the female conical part of the toothed wheel in the clutched position of the clutch 5 corresponding to the converged position of the driving element 6 to the driven element 7.

Figure 6:
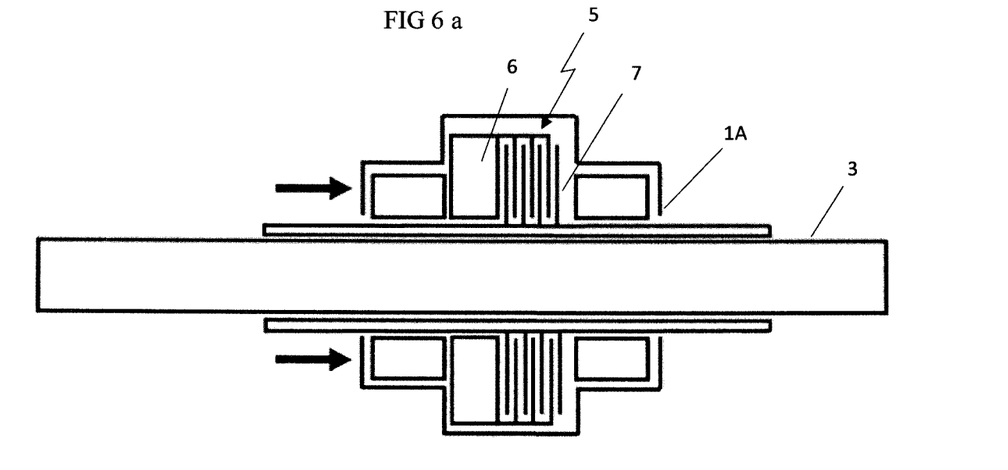
FIGS. 6a and 6b represent a schematic view of a transmission housing in the declutched position of the disk clutch (FIG. 6a) and in the clutched position of the disk clutch (FIG. 6b).

FIGS. 6a and 6b also illustrate a similar operation of the clutch 5. The clutch 5 is, in this case, a disk clutch, with the driving element formed by a toothed wheel secured in displacement to a plurality of disks capable of cooperating by bearing contact with a series of disks forming the active part of the driven element.

It should be noted that, in these embodiments, the sleeve 9 partially protrudes from the body of the housing when the sleeve is mounted on the output shaft.

Independently of the embodiment of the clutch, the operation is always the same for the switch from the declutched position to the clutched position of the clutch 5. The operator actuates the maneuvering member 11, which brings about a sliding displacement of the body 1A of the housing along the output shaft, in the direction of a convergence of the driving element 6 to the driven element 7. The elastically deformable return member 12 returns the driving element 6 and the body 1A of the housing to the separated position of the driven element 7, this separating position corresponding to the declutched position of the clutch 5. The return member 12 is therefore active against the maneuvering member and the driving of the body 1A of the housing in a sliding displacement in the direction of convergence of the driving element to the driven element.

To allow such an operation, the driven element 7 is limited in axial displacement along the output shaft 3 at least in the direction of a separation of the driving element 6. This limitation of axial displacement is, here, obtained by the rotation securing means of the driven element 7 and of the output shaft 3.

Once again, the rotation securing means of the driven element and of the output shaft 3 can be diverse and varied. In the example represented in the FIGS. 11a and 11b, in which the sleeve 9 partially protrudes from the body 1A of the housing, the sleeve 9 is mounted to be secured in rotation to the output shaft 3 via at least one link member 15 disposed outside the body 1A of the housing 1.

In this case, here, there are two link members 15 and they are formed by pins disposed on either side of the body 1A of the housing, these pins passing through the output shaft and each being inserted by their ends into a through orifice of the sleeve.

In the example represented in FIGS. 10A to 10D, the sleeve 9 is internally grooved longitudinally and is mounted to be secured in rotation to the output shaft 3 via at least one external radial protuberance 14 of the output shaft 3, this external radial protuberance 14 being produced in a single piece with the output shaft 3 or formed by at least one element added on to the output shaft 3, this at least one external radial protuberance 14 being slidingly inserted into an internal longitudinal groove 91 of the sleeve 9.

Figure 10:
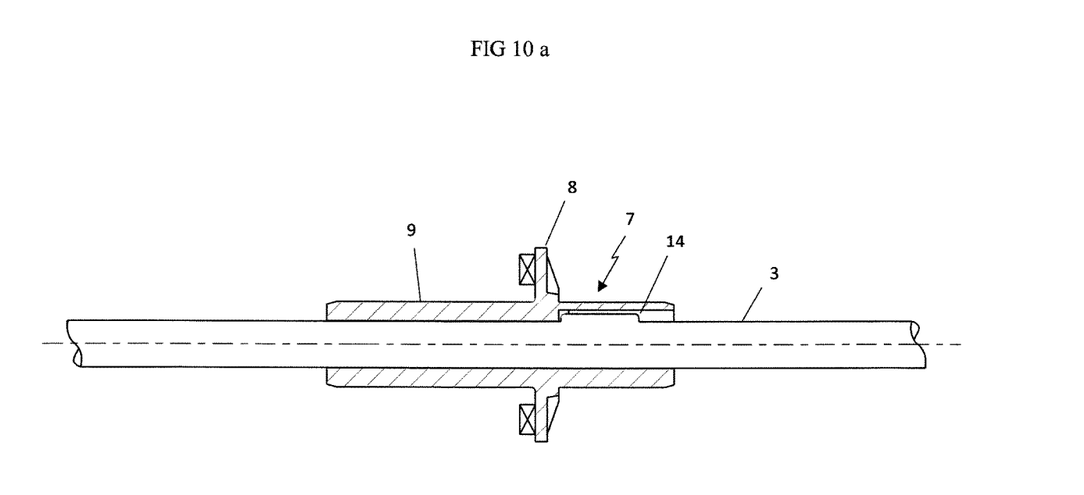
FIGS. 10A to 10F represent, in the form of cross-sectional or perspective views, embodiments for the rotational securing of the output shaft and of the sleeve.

This internal longitudinal groove 91 of the sleeve 9 can be blind, as in the example of FIG. 10D, to limit the axial displacement of the driven element 7 in the direction of separation from the driving element.

As a variant, an axial abutment for limiting the axial displacement of the driven element in the direction of separation from the driving element can be provided on the output shaft, as represented in FIG. 10B or in FIG. 10F. In FIG. 10F, the longitudinal striations are formed on the output shaft and an internal circumferential shoulder is formed on the sleeve.

In these embodiments, it appears that the output shaft 3 is, in the closed position of the enclosure 1B of the housing 1, removably mounted inside the enclosure 1B of the housing 1.

It is in fact sufficient to remove the pins or to relatively slide the body 1A of the housing and the output shaft 3 to obtain the separation of the output shaft 3 from the body 1A of the housing.

Figure 7:
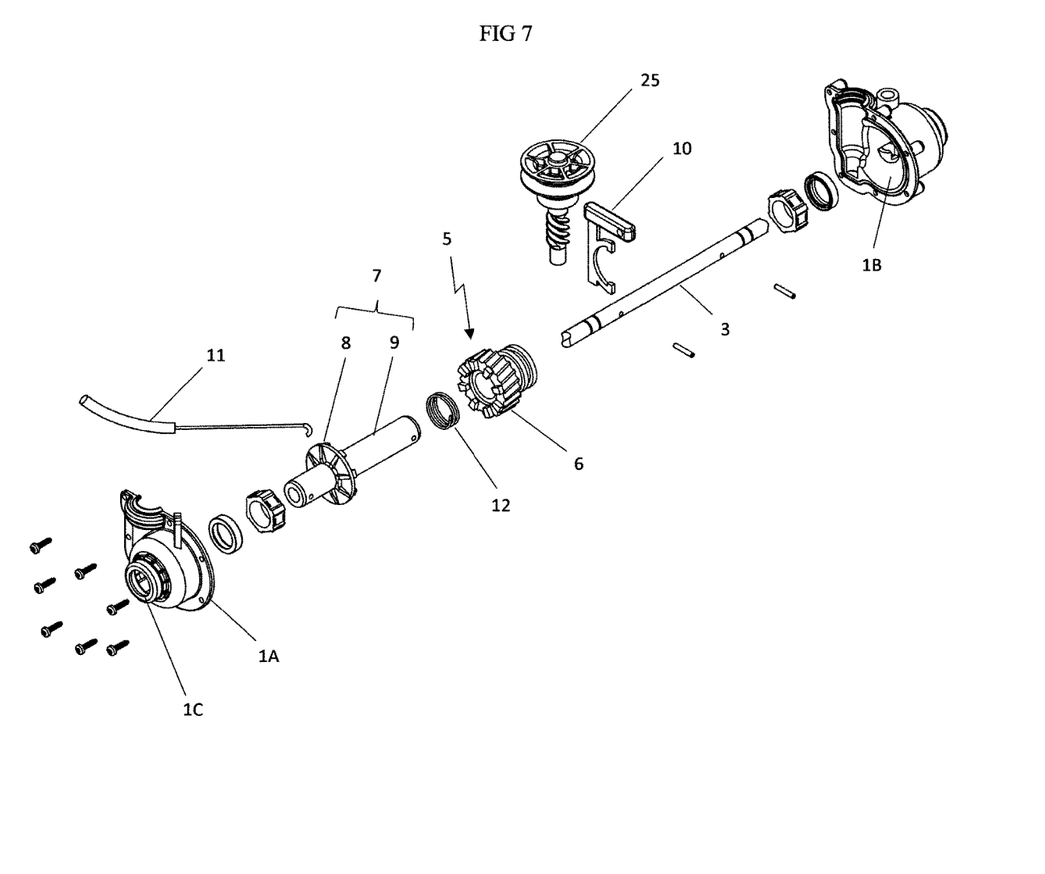
FIG. 7 represents an exploded view of the constituent elements of another embodiment of a transmission housing according to the invention.
Figure 8:
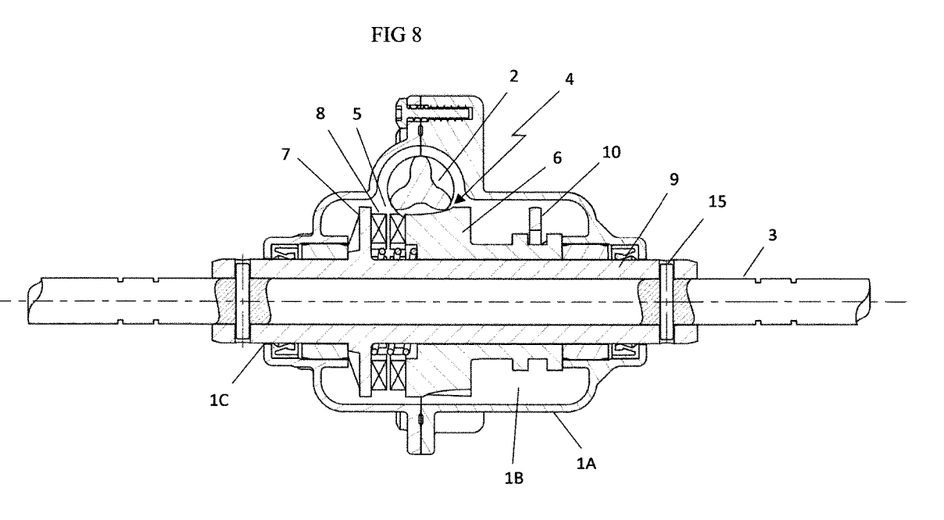
FIGS. 8 and 9 represent cross-sectional views of the transmission housing of FIG. 7 in declutched position (FIG. 8) and in clutched position (FIG. 9).
Figure 9:
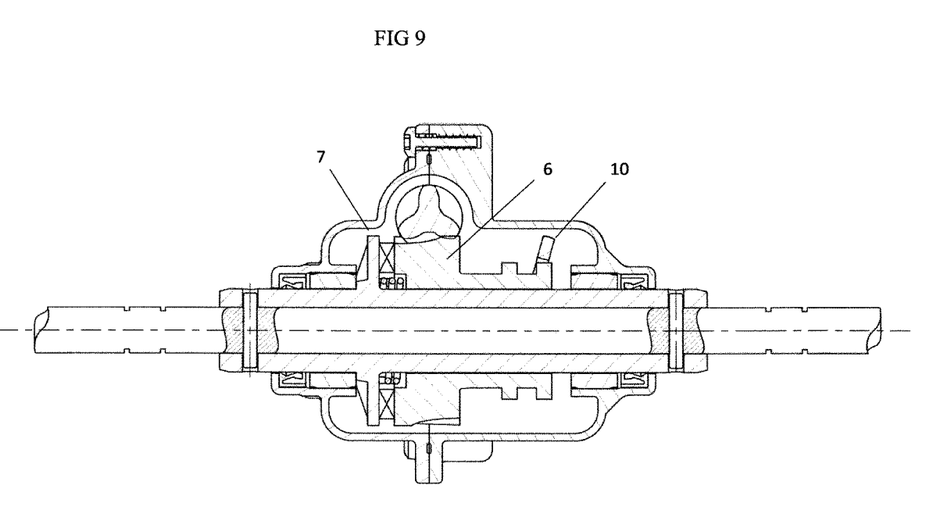

The clutch control for switching the clutch 5 from the declutched position to the clutched position can also be operated using a control device housed at least partially inside the body 1A of the housing, as illustrated in FIGS. 7 to 9 for example. In this case, the member 10 controlling the convergence of the driving element to the driven element is formed by a fork housed partially inside the housing, this fork being able to be angularly displaced, under the action of a maneuvering member 11 formed by a cable coupled at one end to said fork and at the other end to a pivoting lever with which the handlebar of the vehicle is equipped. This fork engages with an annular groove of the driving element.

The angular displacement of the fork brings about an axial displacement of the driving element in the direction of convergence to the driven element. Once again, the driving element can be a toothed wheel provided, on one of its faces, with teeth, and the driven element can be a sleeve surrounded by a toothed plate, the clutch being of the claw type, as described previously.

In this embodiment, the sleeve is preferably mounted to be axially fixed on the output shaft 3 and secured in rotation thereto. The sleeve externally comprises at least one external peripheral shoulder which limits the relative axial displacement of the body 1A of the housing and of the sleeve 9.

In this embodiment, the switching of the clutch 5 from the declutched position to the clutched position operates as follows: the operator actuates the maneuvering member 11, which brings about an angular displacement of the fork. The latter pushes the driving element toward the active part of the driven element, an elastically deformable return member 12 disposed between the driving and driven elements returns the driving element to the position separated from the driven element.

In the exemplary embodiments described, each time, the sleeve 9 of the driven element 6 is either mounted to be fixed axially on the output shaft 3, or limited in axial displacement on the output shaft 3, in the direction of separation from the driving element.

The invention claimed is:
1. A transmission housing comprising:
a body of the housing delimiting an enclosure and,
disposed at least partially inside said enclosure, an input shaft, an output shaft and a mechanism for transmitting the movement of the input shaft to the output shaft,
this movement transmission mechanism having at least one clutch, the clutch having a driving element and a driven element, the driven element being mounted to be secured in rotation to the output shaft, at least one of the driven or driving elements of the clutch being mounted to be able to be displaced for the driving and driven elements of the clutch to switch from a position separated from one another corresponding to the declutched position of the clutch to a position close to one another corresponding to the clutched position of the clutch, the driven element of the clutch having an active part of the clutch and a sleeve which bears the active part of the clutch, the active part of the clutch being in bearing contact with the driving element of the clutch in the clutched position of the clutch, the sleeve being coaxial to the output shaft and mounted to be secured in rotation to the output shaft, wherein the sleeve of the driven element is produced in a single piece with the active part of the driven element and in that the sleeve is interposed between the output shaft and the body of the housing, wherein the output shaft is a shaft passing through the body of the housing and protruding from the body of the housing through two openings formed in the body of the housing, and in that the sleeve is, at these openings, interposed between the output shaft and the body of the housing.

2. The transmission housing as claimed in claim 1, wherein the output shaft is, in the closed position of the enclosure of the housing, removably mounted inside the enclosure of the housing.

3. The transmission housing as claimed in claim 1, wherein the driving element is threaded onto the sleeve.

4. The transmission housing as claimed in claim 1, wherein the sleeve is internally grooved longitudinally and is mounted to be secured in rotation to the output shaft via at least one external radial protuberance of the output shaft, this external radial protuberance being produced in a single piece with the output shaft or formed by at least one element added on to the output shaft, this at least one external radial protuberance being slidingly inserted into an internal longitudinal groove of the sleeve.

5. The transmission housing as claimed in claim 1, wherein the sleeve at least partially protrudes from the body of the housing.

6. The transmission housing as claimed in claim 5, wherein the sleeve is mounted to be secured in rotation to the output shaft via at least one link member disposed outside the body of the housing.

7. The transmission housing as claimed in claim 1, wherein the driving element of the clutch is a rotary element that can be driven in rotation by the input shaft.

8. The transmission housing as claimed in claim 1, wherein the clutch is a non-progressive clutch, selected from the group consisting of a claw clutch.

9. The transmission housing as claimed in claim 1, wherein the housing comprises, for the switch from the declutched position to the clutched position, a control device for the clutch.

10. The transmission housing as claimed in claim 1, wherein the driven element is limited in axial displacement at least in the direction of separation from the driving element and in that the housing comprises at least one return member for returning the driving and driven elements into the position separated from one another corresponding to the declutched position.

11. The transmission housing as claimed in claim 1, wherein the body of the housing is formed by at least two shells joined to one another in closed position of the housing.

12. A wheeled vehicle equipped with a transmission housing as claimed in claim 1.

* * * * *